United States Patent
Imaoka

(10) Patent No.: US 10,801,580 B2
(45) Date of Patent: Oct. 13, 2020

(54) WRAPPED V-BELT AND METHOD FOR MANUFACTURING WRAPPED V-BELT

(71) Applicant: Mitsuboshi Belting Ltd., Kobe-shi, Hyogo (JP)

(72) Inventor: Teruyoshi Imaoka, Hyogo (JP)

(73) Assignee: Mitsuboshi Belting Ltd., Kobe-shi, Hyogo (JP)

( * ) Notice: Subject to any disclaimer, the term of this patent is extended or adjusted under 35 U.S.C. 154(b) by 398 days.

(21) Appl. No.: 15/564,440

(22) PCT Filed: Apr. 27, 2016

(86) PCT No.: PCT/JP2016/063298
§ 371 (c)(1),
(2) Date: Oct. 5, 2017

(87) PCT Pub. No.: WO2016/175265
PCT Pub. Date: Nov. 3, 2016

(65) Prior Publication Data
US 2018/0080527 A1  Mar. 22, 2018

(30) Foreign Application Priority Data

Apr. 27, 2015  (JP) .................................. 2015-090863
Apr. 15, 2016  (JP) .................................. 2016-082404

(51) Int. Cl.
*F16G 5/20* (2006.01)
*B29C 65/00* (2006.01)
*B29D 29/08* (2006.01)
*B29C 69/00* (2006.01)
(Continued)

(52) U.S. Cl.
CPC ................ *F16G 5/20* (2013.01); *B29C 66/45* (2013.01); *B29C 66/729* (2013.01);
(Continued)

(58) Field of Classification Search
CPC .... F16G 5/20; F16G 5/06; F16G 1/10; G16G 5/08; B29D 29/08; B29D 29/10
See application file for complete search history.

(56) References Cited

U.S. PATENT DOCUMENTS 4,264,314 A    4/1981  Imamura
2006/0287434 A1*  12/2006  Wood ..................... C08L 21/00
                                                       525/192
(Continued)

FOREIGN PATENT DOCUMENTS

DE    2359216 A1   6/1974
EP    0010919 A1   5/1980
(Continued)

OTHER PUBLICATIONS

Nov. 28, 2018—(CN) Notification of First Office Action—App 201680024026.7, Eng Tran.
(Continued)

*Primary Examiner* — Michael R Mansen
*Assistant Examiner* — Robert T Reese
(74) *Attorney, Agent, or Firm* — Banner & Witcoff, Ltd.

(57) ABSTRACT

A wrapped V-belt includes: a belt main body containing a compression layer containing a compression rubber layer and a fabric-laminated body layer a tension rubber layer and a tension member buried between the compression layer and the tension rubber layer; and an outside cloth that covers a periphery of the belt main body, in which the compression layer has a plurality of notch portions not covered with the outside cloth, and the notch portion has a top disposed in the fabric-laminated body layer.

13 Claims, 4 Drawing Sheets

(51) Int. Cl.
  *B32B 25/10* (2006.01)
  *B32B 5/02* (2006.01)
  *B32B 5/26* (2006.01)
  *B32B 38/00* (2006.01)
  *B32B 37/14* (2006.01)
  *B32B 25/16* (2006.01)
  *F16G 5/08* (2006.01)
  *F16G 5/06* (2006.01)
  *B29D 29/10* (2006.01)
  *B29K 711/10* (2006.01)
  *B29L 31/00* (2006.01)

(52) U.S. Cl.
  CPC ...... *B29C 66/73752* (2013.01); *B29C 69/002* (2013.01); *B29D 29/08* (2013.01); *B29D 29/106* (2013.01); *B32B 5/024* (2013.01); *B32B 5/26* (2013.01); *B32B 25/10* (2013.01); *B32B 25/16* (2013.01); *B32B 37/144* (2013.01); *B32B 38/0004* (2013.01); *F16G 5/06* (2013.01); *F16G 5/08* (2013.01); *B29K 2611/00* (2013.01); *B29K 2711/10* (2013.01); *B29K 2713/00* (2013.01); *B29K 2995/0086* (2013.01); *B29K 2995/0087* (2013.01); *B29L 2031/7094* (2013.01); *B32B 2262/062* (2013.01); *B32B 2305/188* (2013.01); *B32B 2307/552* (2013.01); *B32B 2307/554* (2013.01); *B32B 2317/18* (2013.01); *B32B 2319/00* (2013.01); *B32B 2433/04* (2013.01)

(56) References Cited

U.S. PATENT DOCUMENTS

| 2009/0227406 | A1* | 9/2009 | Wu | C08G 18/12 474/238 |
|---|---|---|---|---|
| 2015/0218357 | A1* | 8/2015 | Feng | F16G 1/08 428/36.8 |
| 2015/0285334 | A1* | 10/2015 | Thomas | F16G 1/10 474/90 |
| 2016/0347013 | A1* | 12/2016 | Miyata | B29D 29/10 |
| 2017/0023098 | A1* | 1/2017 | Burlett | B29D 29/08 |
| 2017/0299017 | A1* | 10/2017 | Gregg | F16G 1/08 |

FOREIGN PATENT DOCUMENTS

| EP | 0018456 A1 | 11/1980 |
| GB | 1187266 A | 4/1970 |
| JP | H04-138143 U | 12/1992 |
| JP | H05-022093 B2 | 3/1993 |
| JP | H10-132034 A | 5/1998 |
| JP | 2001-187942 A | 7/2001 |
| JP | 2004-183764 A | 7/2004 |
| WO | 2014-017012 A1 | 1/2014 |

OTHER PUBLICATIONS

Oct. 29, 2018—(EP) Extended Search Report—App 16786541.9.
Jul. 11, 2019—(CN) Notification of the Second Office Action—App 201680024026.7, Eng Tran.
Jul. 19, 2016—International Search Report—Intl App PCT/JP2016/063298.
Sep. 26, 2017—(JP) Notification of Reasons for Refusal—App 2016-082404, Eng Tran.
Feb. 3, 2020—(CN) Notification of the Third Office Action—App 201680024026.7, Eng Tran.
Jun. 2, 2020—(CN) Decision of Rejection—App 201680024026.7, Eng Tran.

* cited by examiner

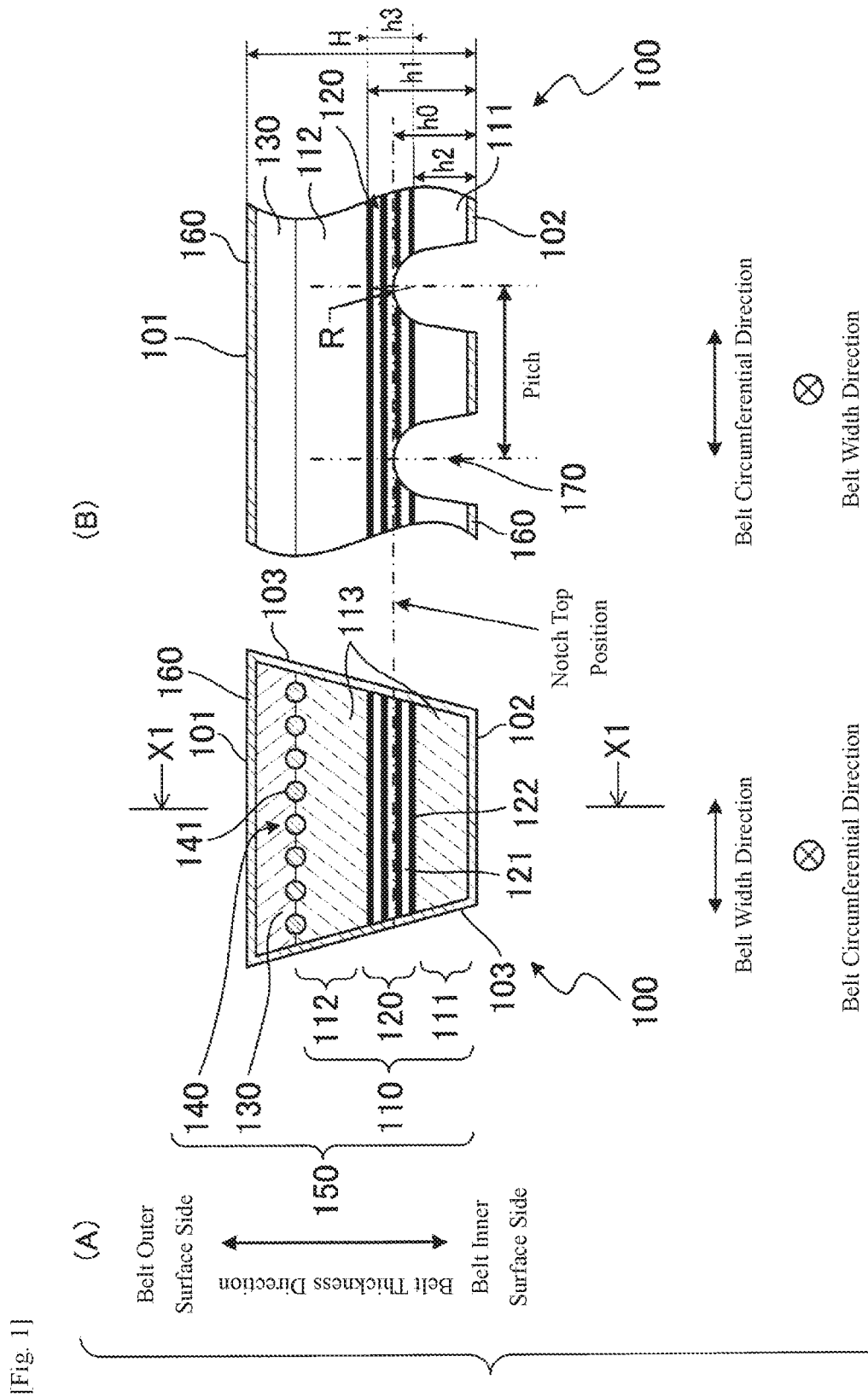
[Fig. 1]

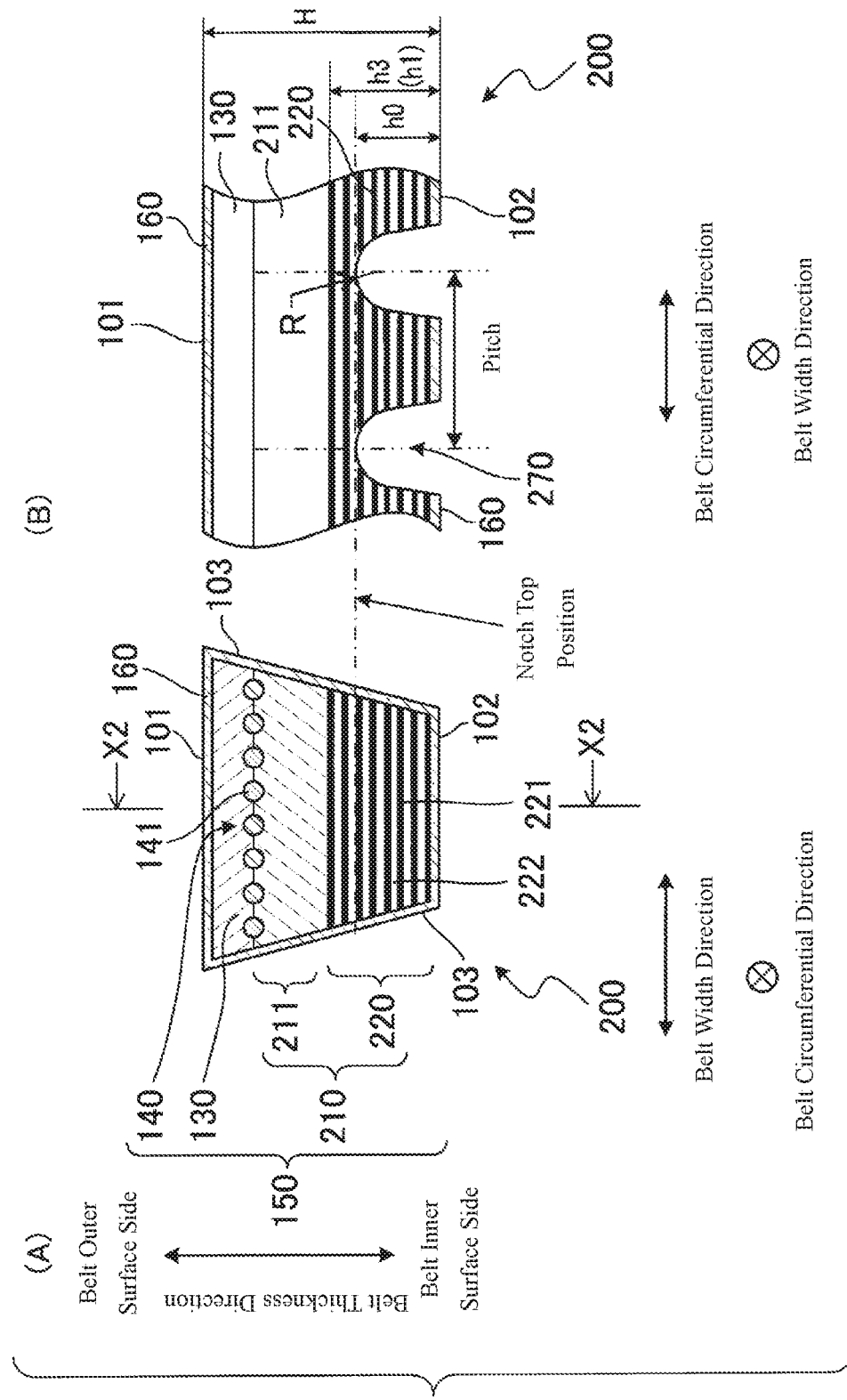

[Fig. 3]
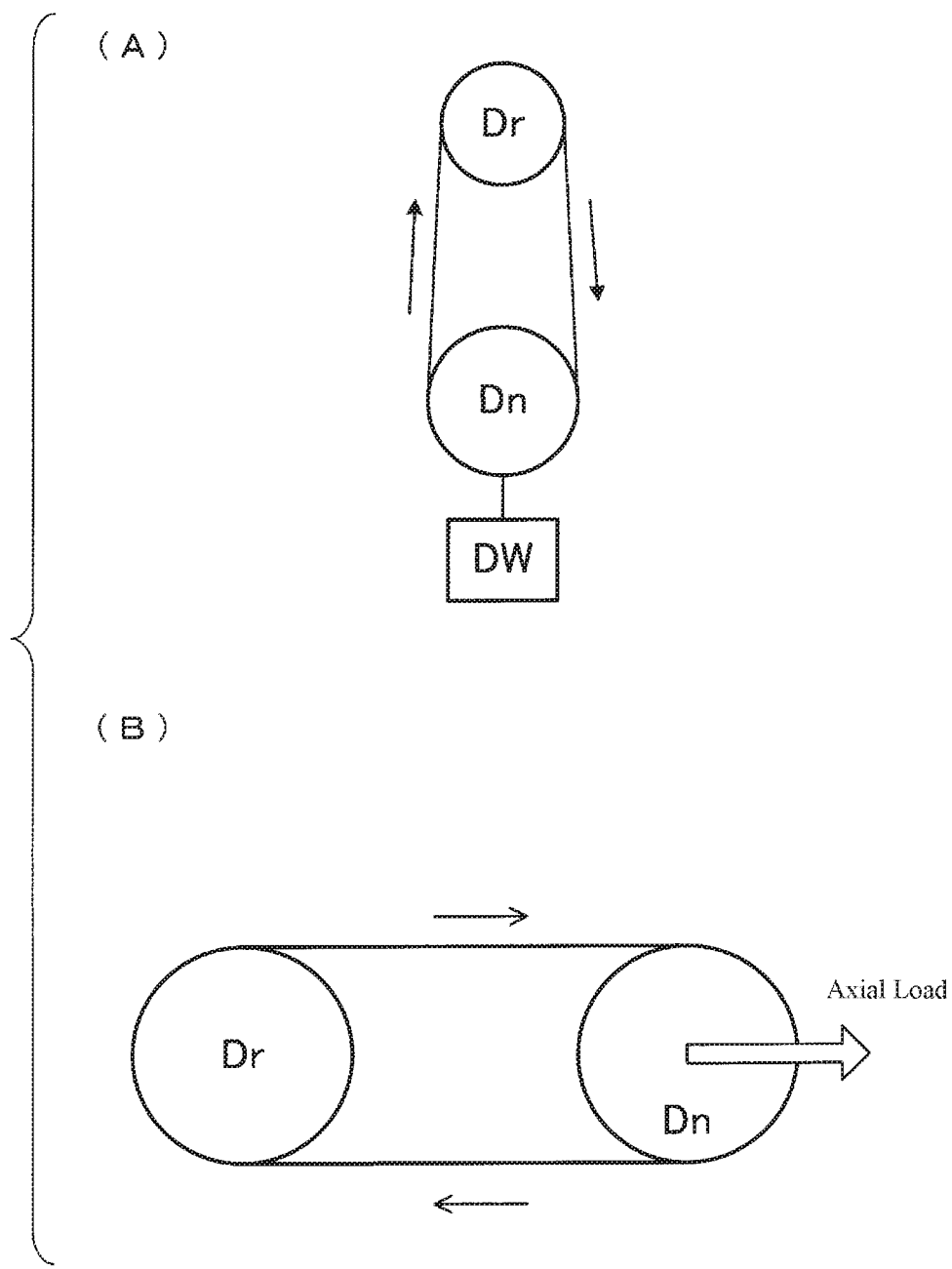

[Fig. 4]
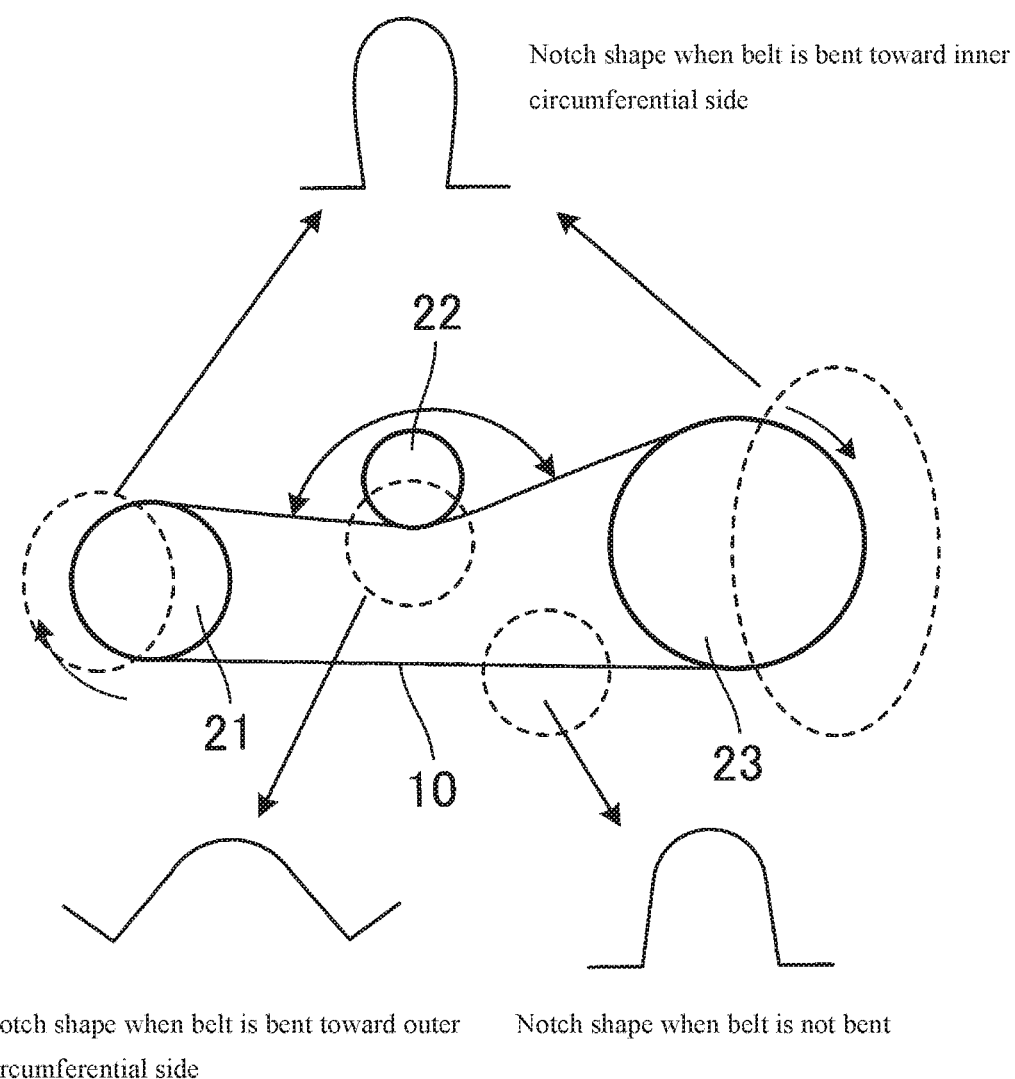

WRAPPED V-BELT AND METHOD FOR MANUFACTURING WRAPPED V-BELT

CROSS REFERENCE TO RELATED APPLICATIONS:

This is U.S. National Phase application under 35 U.S.C. § 371 of International Application No. PCT/JP2016/063298, filed Apr. 27, 2015, which claims priority to Japanese Applications 2016-082404 filed Apr. 15, 2016, and 2015-090863 filed Apr. 27, 2015, which was published Under PCT Article 21(2), the entire contents of which are incorporated herein by reference.

TECHNICAL FIELD

The present invention relates to a wrapped V-belt having notch portions and a method for manufacturing a wrapped V-belt.

BACKGROUND ART

As a power transmission belt which transmits power, a frictional power transmission belt such as a V-belt, a V-ribbed belt, and a flat belt, is known. In the V-belt, a section orthogonal to a belt circumferential direction is formed in a V shape. Both side surfaces (both side surfaces in a belt circumferential direction) of the V-shaped section of the V-belt are a frictional power transmission surface for transmitting power using a frictional force. Examples of the V-belt include a raw edge type (raw edge V-belt) of which a frictional power transmission surface is an exposed rubber layer, and a wrapped type (wrapped V-belt) of which a frictional power transmission surface is covered with outside cloth (that is, cover cloth). The raw edge V-belt and the wrapped V-belt are used differently in accordance with the use due to a difference in surface properties (coefficient of friction between the rubber layer and the outside cloth) of the frictional power transmission surface.

For a general industrial machine or an agricultural machine, such as a compressor, a generator or a pump, the wrapped V-belt is generally and widely used. In the wrapped V-belt, the periphery of a main body of an endless belt in which a tension member is buried between a compression rubber layer on a belt inner surface side and a tension rubber layer on the outer circumferential side, is covered with the outside cloth along the entire length in the belt circumferential direction (for example, Patent Document 1).

The wrapped V-belt rotates and travels while being wound around a plurality of pulleys, both of the left and right side surfaces of the V-shaped section becomes the frictional power transmission surface that comes into contact with an inner wall surface of a V-groove of the pulley, and the wrapped V-belt transmits power by using frictional force on the frictional power transmission surface. As illustrated in FIG. 4, a wrapped V-belt 10 wound around a pulley 21 and a pulley 23 is bent to a belt inner surface side along the shape of the pulleys. In addition, as illustrated in FIG. 4, by a tension pulley 22 disposed on the belt outer surface side, the wrapped V-belt 10 is also bent to a belt outer surface side along the shape of the pulley.

A wrapped V-belt in which a plurality of notch portions formed to extend in a belt width direction on the belt inner surface side are installed at an equivalent pitch in the belt circumferential direction, is suggested (for example, Patent Document 2). In these wrapped V-belts, bendability is enhanced by the notch portions, and bending rigidity in the belt circumferential direction at bending is reduced. As a result, a loss of energy due to a bending stress in the belt circumferential direction can be suppressed to contribute to saving energy.

In the wrapped V-belt having the notch portions described in Patent Document 2, after forming the wrapped V-belt by covering the whole peripheral surface of the belt main body with V-shaped section configured of the tension rubber layer, the compression rubber layer, and the tension member with the outside cloth, a cut or a punch is made on the belt inner surface side by mechanical processing such as cutting or punching to form the notch portions. Therefore, on an inner surface of the notch portion (a surface on which a cut or a punch is made), a rubber composition of the compression rubber layer is exposed.

In the case where the wrapped V-belt having the notch portions is made to rotate and travel while being wound around a plurality of pulleys, the notch portions are deformed to the inner side (in a closing direction) when the wrapped V-belt is bent to the inner circumferential side, and thus, a compressive stress is applied to the top of the notch portions. Meanwhile, since the notch portions are deformed to the outer side (in an opening direction) when the wrapped V-belt is bent to the outer circumferential side, a tensile (tearing) stress is applied to the top of the notch portions. Therefore, for example, as illustrated in FIG. 4, in a case of the layout in which the wrapped V-belt 10 is bent to the belt inner surface side and the belt outer surface side by the pulleys 21 to 23, the shape (deformation) in which the wrapped V-belt is bent to the inner circumferential side and the shape (deformation) in which the wrapped V-belt is bent to the outer circumferential side are continuously repeated, and thus, a deforming stress is locally concentrated at the top of the notch portions.

And then, in the case where the rubber composition is exposed in the inner surface of the notch portion (particularly, the top of the notch portions at which the deforming stress is locally concentrated), there is a concern that cracks generate from the top of the notch portions to cause early fracture of the wrapped V-belt.

PRIOR ART DOCUMENT

Patent Document

PATENT DOCUMENT 1: JP-A-H10-132034
PATENT DOCUMENT 2: WO2014/017012

SUMMARY OF THE INVENTION

Problems that the Invention is to Solve

The present invention is to solve the above-described problem, and an object thereof is to provide a wrapped V-belt that can improve crack resistance and a method for manufacturing a wrapped V-belt, regarding the wrapped V-belt having notch portions.

Means for Solving the Problems

In order to solve the above-described problem, the wrapped V-belt according to the present invention is a wrapped V-belt which is made to travel while a belt inner surface side thereof is wound around a pulley, containing: a belt main body containing a compression layer disposed on the belt inner surface side and containing a compression rubber layer and a fabric-laminated body layer in which a plurality of pieces of a rubber composition-attached fabric are laminated and adhered to each other, a tension rubber layer disposed on a belt outer surface side, and a tension member buried between the compression layer and the tension rubber layer, and having a V shape with a width on the belt inner surface side being smaller than a width on the belt outer surface side on a section in a belt width direction; and an outside cloth that covers a periphery of the belt main body over an entire length in a belt circumferential direction, in which the compression layer has a plurality of notch portions formed to extend in the belt width direction to be open on the belt inner surface side, are disposed to be aligned in the belt circumferential direction, and are not covered with the outside cloth, and in which the notch portion has a top positioned on the most belt outer surface side in a belt thickness direction and disposed in the fabric-laminated body layer.

The method for manufacturing a wrapped V-belt according to the present invention contains: a step of preparing a wrapped V-belt containing a belt main body containing a compression layer disposed on a belt inner surface side and containing a compression rubber layer and a fabric-laminated body layer in which a plurality of pieces of a rubber composition-attached fabric are laminated and adhered to each other, a tension member, and a tension rubber layer disposed on a belt outer surface side, and an outside cloth that covers a periphery of the belt main body over an entire length in a belt circumferential direction; and a step of forming notch portions formed to extend in a belt width direction to be open on the belt inner surface side of the compression layer and disposed to be aligned in the belt circumferential direction such that a top positioned on the most belt outer surface side in the belt thickness direction is disposed in the fabric-laminated body layer, with respect to the wrapped V-belt.

In the wrapped V-belt and the method for manufacturing a wrapped V-belt according to the present invention, the periphery of the belt main body except for the notch portions is covered with the outside cloth over the entire length. In other words, the notch portions are not covered with the outside cloth, and thus, the compression rubber layer and the fabric-laminated body layer are exposed. Here, at the top positioned on the most belt outer surface side in the belt thickness direction of the notch portion, a deforming stress in the belt circumferential direction is locally concentrated when deformation of the shape of the notch portions following the bending of the belt is continuously repeated. Here, the top of the notch portion is disposed in the fabric-laminated body layer. In other words, in the notch portions, the top at which the deforming stress in the belt circumferential direction is locally concentrated is disposed in the fabric-laminated body layer. Therefore, at the top of the notch portions at which the deforming stress in the belt circumferential direction is locally concentrated when the belt is bent, the fabric in the fabric-laminated body layer serves as a reinforcing layer. In addition, a fabric-laminated body serving the fabric-laminated body layer is one obtained by laminating the rubber composition-attached fabric. Therefore, at the time of vulcanizing a formed body to be the wrapped V-belt, in accordance with a vulcanization reaction of the rubber composition, adhesion (integral lamination) of fabric pieces to each other, and further, of the fabric-laminated body layer and the periphery (the first compression rubber layer and the second compression rubber layer, or the outside cloth), can be easily and reliably performed. In other words, it is possible to increase rigidity of the fabric-laminated body layer. From the above, it is possible to suppress generation of cracks in the notch portions. In addition, it is possible to improve crack resistance of the notch portions.

In the wrapped V-belt according to the present invention, the compression rubber layer may contain a first compression rubber layer and a second compression rubber layer, and the compression layer may be disposed in order of the first compression rubber layer, the fabric-laminated body layer, and the second compression rubber layer from the belt inner surface side to the belt outer surface side.

In addition, in the method for manufacturing a wrapped V-belt according to the present invention, the compression rubber layer may contain a first compression rubber layer and a second compression rubber layer, and the step of preparing a wrapped V-belt may include a step of forming a formed body by winding an unvulcanized rubber composition sheet to be the first compression rubber layer, a fabric-laminated body to be the fabric-laminated body layer in which a plurality of pieces of the rubber composition-attached fabric are laminated, an unvulcanized rubber composition sheet to be the second compression rubber layer, a core wire to form the tension member, and an unvulcanized rubber sheet to be the tension rubber layer in this order from the belt inner surface side to the belt outer surface side, in a forming drum; a step of processing the formed body into the belt main body by cutting to have a predetermined width and by cutting to have a V shape with a width on the belt inner surface side being smaller than a width on the belt outer surface side on a section in the belt width direction; and a step of winding the outside cloth on the belt main body and conducting vulcanization.

According to this, the compression layer is disposed in order of the first compression rubber layer, the fabric-laminated body layer, and the second compression rubber layer from the belt inner surface side to the belt outer surface side. Therefore, it is possible to dispose the fabric-laminated body layer in accordance with the length (depth) of the notch portions in the belt thickness direction. In other words, it is possible to more reliably form the notch portions such that the top thereof is disposed in the fabric-laminated body layer. From the above, it is possible to more reliably suppress the generation of cracks in the notch portions. Thus, it is possible to improve crack resistance of the notch portions.

Here, in the belt thickness direction of the wrapped V-belt, a ratio of the total thickness of the first compression rubber layer and the fabric-laminated body layer with respect to a thickness of the entire wrapped V-belt may be from 45 to 65%, and a ratio of the thickness of the first compression rubber layer with respect to the thickness of the entire wrapped V-belt may be from 15 to 25%. Furthermore, it is preferable that, in the belt thickness direction of the wrapped V-belt, the ratio of the total thickness of the first compression rubber layer and the fabric-laminated body layer with respect to the thickness of the entire wrapped V-belt is from 45 to 55%, and the ratio of the thickness of the first compression rubber layer with respect to the thickness of the entire wrapped V-belt is from 20 to 25%.

According to this constitution, the total thickness of the first compression rubber layer and the fabric-laminated body layer is set to be from 45 to 65%, preferably from 45 to 55%, of the thickness of the entire wrapped V-belt. In addition, the thickness of the first compression rubber layer is set to be from 15 to 25%, preferably from 20 to 25%, of the thickness of the entire wrapped V-belt. Therefore, it is possible to more reliably form the notch portions such that the top thereof is disposed in the fabric-laminated body layer. In addition, it is possible to increase rigidity of the compression layer. Thus, it is possible to more reliably suppress the generation of cracks in the notch portions. Therefore, it is possible to improve crack resistance of the notch portions.

In addition, in the wrapped V-belt according to the present invention, the fabric-laminated body layer and the compression rubber layer may be disposed in this order from the belt inner surface side to the belt outer surface side.

In addition, in the method for manufacturing a wrapped V-belt according to the present invention, the step of preparing a wrapped V-belt may include a step of forming a formed body by winding a fabric-laminated body to be the fabric-laminated body layer in which a plurality of pieces of the rubber composition-attached fabric are laminated, an unvulcanized rubber composition sheet to be the compression rubber layer, a core wire to form the tension member, and an unvulcanized rubber sheet to be the tension rubber layer in this order from the belt inner surface side to the belt outer surface side, in a forming drum; a step of processing the formed body into the belt main body by cutting to have a predetermined width and by cutting to have a V shape with a width on the belt inner surface side being smaller than a width on the belt outer surface side on a section in the belt width direction; and a step of winding the outside cloth on the belt main body and conducting vulcanization.

The top of the notch portion, positioned on the most belt outer surface side, tends to intensively receive also a deforming stress in the belt width direction due to a lateral pressure which a frictional power transmission surface that is both belt side surfaces receives from the pulley. According to them, the belt inner surface side is configured of the fabric-laminated body layer. In other words, rigidity of the compression layer is increased. Therefore, since lateral pressure resistance with respect to the pulley is excellent and it is hard to receive the deforming stress in the belt width direction, it is possible to suppress the generation of cracks in the notch portions.

Here, in the belt thickness direction of the wrapped V-belt, a ratio of the thickness of the fabric-laminated body layer with respect to the thickness of the entire wrapped V-belt may be from 45 to 65%. Furthermore, it is preferable that, in the belt thickness direction of the wrapped V-belt, the ratio of the thickness of the fabric-laminated body layer with respect to the thickness of the entire wrapped V-belt is from 45 to 55%.

According to this constitution, the thickness of the fabric-laminated body layer is set to be from 45 to 65%, preferably from 45 to 55%, of the thickness of the entire wrapped V-belt. Therefore, it is possible to more reliably form the notch portions such that the top thereof is disposed in the fabric-laminated body layer. In addition, it is possible to increase rigidity of the compression layer. Then, it is possible to more reliably suppress the generation of cracks in the notch portions. Therefore, it is possible to improve crack resistance of the notch portions.

In the wrapped V-belt, the notch portions are preferably not formed in at least one or more layers on the belt outer surface side in the fabrics laminated to form the fabric-laminated body layer.

According to this constitution, the notch portions are formed such that at least one or more layers of laminated fabrics that form the fabric-laminated body remain unpunched. Therefore, at the top of the notch portions, it is possible to sufficiently ensure the fabric(s) of the fabric-laminated body which serves the reinforcing layer. In addition, it is possible to more reliably suppress the generation of cracks in the notch portions. Therefore, it is possible to improve crack resistance of the notch portions.

Advantageous Effect of the Invention

As described above, according to the present invention, it is possible to provide a wrapped V-belt that can improve crack resistance and a method for manufacturing a wrapped V-belt, regarding the wrapped V-belt having notch portions.

BRIEF DESCRIPTION OF DRAWINGS

FIG. 1 is a sectional view illustrating a wrapped V-belt according to a first embodiment, (A) is a sectional view in a belt width direction, and (B) is a sectional view in a belt circumferential direction in X1-X1 of (A).

FIG. 2 is a sectional view illustrating a wrapped V-belt according to a second embodiment, (A) is a sectional view in the belt width direction, and (B) is a sectional view in the belt circumferential direction in X2-X2 of (A).

FIG. 3 is a schematic view illustrating a running tester of the wrapped V-belt, (A) is the running tester used when performing a bending fatigue test under a bending fatigue test condition A, and (B) is a running tester used when performing a bending fatigue test under a bending fatigue test condition B.

FIG. 4 is a schematic view illustrating a layout of a pulley around which a wrapped V-belt is wound.

MODE FOR CARRYING OUT THE INVENTION

Embodiments of the present invention will be described with reference to the drawings. In a wrapped V-belt and a method for manufacturing a wrapped V-belt according to the embodiments, in a general industrial machine or an agricultural machine, such as a compressor, a generator or a pump, it is made to travel while a belt inner surface side is wound around a pulley.

<First Embodiment>

[Wrapped V-Belt]

First, based on FIG. 1, a wrapped V-belt according to a first embodiment will be described.

As illustrated in FIG. 1, a wrapped V-belt 100 is configured of a belt main body 150 and an outside cloth 160 which covers a periphery of the belt main body 150 over an entire length in a belt circumferential direction. As illustrated in (A) of FIG. 1, the belt main body 150 is formed such that a section in a belt width direction has a V shape of which a width on a belt inner surface side is smaller than a width on a belt outer surface side. In the wrapped V-belt 100, the left and right belt side surfaces 103 covered with the outside cloth 160 serve as frictional power transmission surfaces that come into contact with an inner wall surface of a V-groove of a V-groove pulley. Furthermore, the wrapped V-belt 100 is formed such that the thickness of the entire belt is from 5 to 25 mm and the length (the entire length in the belt circumferential direction) of the belt is from 20 to 400 inches (from 508 to 10,160 mm) in compliance with JISK6323(2008).

Here, the belt inner surface side means a belt inner surface 102 side positioned on the inner circumferential side of the wrapped V-belt 100 when the wrapped V-belt 100 is wound around a pulley. In addition, the belt outer surface side means a belt outer surface 101 side positioned on the outer circumferential side with a pulley of the wrapped V-belt 100 when the wrapped V-belt 100 is wound around the pulley. In FIG. 1, the belt inner surface side is a lower side of the paper surface, and the belt outer surface side is an upper side of the paper surface. In addition, the belt side surfaces 103 are two surfaces in a leftward-and-rightward direction of the paper surface in (A) of FIG. 1, and are surfaces which intersect with the belt inner surface 102 at both of the left and right end portions thereof and with the belt outer surface 101 at both of the left and right end portions thereof.

The belt main body 150 includes a compression layer 110 disposed on the belt inner surface side, a tension rubber layer 130 disposed on the belt outer surface side, and a tension member 140 buried between the compression layer 110 and the tension rubber layer 130. The compression layer 110 contains a compression rubber layer 113 and a fabric-laminated body layer 120. The compression rubber layer 113 contains a first compression rubber layer 111 and a second compression rubber layer 112. The compression layer 110 has a configuration in which the first compression rubber layer 111, the fabric-laminated body layer 120 in which a plurality of pieces of a rubber composition-attached fabric are laminated and adhered to each other, and the second compression rubber layer 112 are laminated from the belt inner surface side to the belt outer surface side. Furthermore, in order to improve adhesiveness between the tension member 140 and the tension rubber layer 130 or the compression layer 110, an adhesive rubber layer may be disposed between the tension rubber layer 130 and the compression layer 110 as necessary.

The first compression rubber layer 111 and the second compression rubber layer 112 of the compression layer 110, and the tension rubber layer 130 are formed of a rubber composition. The rubber compositions which form the first compression rubber layer 111 and the second compression rubber layer 112 of the compression layer 110 and the tension rubber layer 130 may be the same as each other, or may be different from each other. Examples of the rubber component that configures these rubber compositions include rubber capable of being vulcanized or cross-linked, for example, diene rubber such as natural rubber, isoprene rubber, butadiene rubber, chloroprene rubber, styrene butadiene rubber, acrylonitrile-butadiene rubber, and hydrogenated nitrile rubber, ethylene-α-olefin elastomer, chlorosulfonated polyethylene rubber, alkylated chlorosulfonated polyethylene rubber, epichlorohydrin rubber, acrylic rubber, silicone rubber, urethane rubber, and fluororubber. These rubber components can be used independently or in combination of two or more types thereof. Among these, chloroprene rubber and a combination of natural rubber and styrene butadiene rubber are preferable, and chloroprene rubber is the most preferable. Chloroprene rubber may be a sulfur-modified type or may be a non-sulfur-modified type.

In the rubber composition which forms the first compression rubber layer 111 and the second compression rubber layer 112 of the compression layer 110 and the tension rubber layer 130, as necessary, vulcanizing agent or cross-linking agent, co-cross-linking agent, auxiliary vulcanizing agent, vulcanization accelerator, vulcanization retardant, metal oxide (zinc oxide, magnesium oxide, calcium oxide, barium oxide, iron oxide, copper oxide, titanium oxide, aluminum oxide, or the like), enhancer (carbon black, silicon oxide such as hydrous silica or the like), short fiber, filler (clay, calcium carbonate, talc, mica, or the like), softener (oil, such as paraffin oil, naphthene oil or the like), finishing agent or auxiliary finishing agent (stearic acid, metal stearate, wax, paraffin, or the like), anti-aging agent (antioxidant, thermal aging resistor, bending and crack preventing agent, antiozonant, or the like), coloring agent, tackifier, plasticizer, coupling agent (silane coupling agent or the like), stabilizer (ultraviolet absorber, thermal stabilizer or the like), flame retardant, antistatic agent, and the like may be blended. The metal oxide may be blended as a cross-linking agent.

The fabric-laminated body layer 120 is formed as a laminated body in which a plurality pieces of rubber composition 122-attached fabric 121 are laminated and adhered to each other. The number of laminated fabric 121 used in the fabric-laminated body layer 120 is selected in accordance with the entire thickness of the belt main body 150, but is preferably from 4 to 29 (layers). In addition, the average thickness of the rubber composition 122-attached fabric 121 can be appropriately selected in accordance with the type or the like of the wrapped V-belt 100. The average thickness of the rubber composition 122-attached fabric 121 is approximately, for example, from 0.3 to 2 mm, preferably from 0.4 to 1.4 mm, and more preferably from 0.5 to 1.2 mm. In the case where the thickness of the fabric 121 is extremely thin, there is a concern that crack resistance deteriorates. In addition, in the case where the thickness of the fabric 121 is extremely thick, there is a concern that the bendability of the wrapped V-belt deteriorates. Here, in the fabric 121, yarn of synthetic fiber such as polyester, polyamide, aramid, or vinylon or of natural fiber such as cotton, or fiber which is blended yarn made of these, can be used. The fiber used in the fabric 121 is selected in accordance with the use, but generally, cotton is the most preferable from the viewpoint of cost and general-purpose properties. In addition, the fabric 121 is formed of woven fabric manufactured by warp and weft at an intersecting angle of 90° or greater than 90°, such as plain weave, twill weave, or satin weave; knitted fabric such as warp knitting or weft knitting; or fiber material obtained by non-woven fabric. Here, in the case where the fabric 121 is woven fabric, density of the fabric 121 is preferably from 70 to 95 per 5 cm in warp and from 70 to 95 per 5 cm in weft. Furthermore, as the fabric 121, use can be made of a fiber material which is generally used as the outside cloth 160 described later.

The fabric-laminated body layer 120 is formed by performing any treatment of the following (1) to (4) to make the rubber composition 122 adhere to the fabric 121, then, using the rubber composition 122-attached fabric 121 as a precursor, laminating the plurality of precursors. (1) The sheet-like unvulcanized rubber composition 122 is laminated on the fabric 121. In other words, the sheet-like unvulcanized rubber composition 122 having a predetermined thickness is laminated on the fabric 121, and they are made to pass through between rolls which rotate at the same surface speed to thereby adhere to each other. (2) A film of the unvulcanized rubber composition is formed on the fabric 121. In other words, after coating the fabric 121 with rubber cement obtained by dissolving the unvulcanized rubber into a solvent, the solvent is evaporated to form a film of the unvulcanized rubber composition 122 on the surface of the fabric 121. (3) A friction treatment is performed with respect to the fabric 121. In other words, the unvulcanized rubber composition 122 and the fabric 121 are made to pass through at the same time between rolls having different surface speeds by using a calender roll, to thereby rub the unvulcanized rubber composition 122 into between the fibers of the fabric 121. (4) A soaking treatment is performed with respect to the fabric 121. The fabric 121 is made to pass through the inside of a dipping tank of dilute rubber cement (unvulcanized rubber composition 122), the excessive rubber cement is removed by passing it through between two rolls, and the rubber cement (unvulcanized rubber composition 122) is made to infiltrate into the inside of the fibers.

Furthermore, before performing the treatment of the above-described (1) to (4), in order to improve the adhesiveness between the fiber and the rubber composition, a treatment of soaking the fabric 121 in RFL (resorcinol formaldehyde latex) liquid may be performed.

As illustrated in (B) of FIG. 1, the compression layer 110 is formed such that in the belt thickness direction of the wrapped V-belt 100, a ratio of the total thickness h1 of the first compression rubber layer 111 and the fabric-laminated body layer 120 with respect to the entire thickness H of the wrapped V-belt 100 is from 45 to 65% (preferably from 45 to 55%). In addition, it is formed such that in the belt thickness direction of the wrapped V-belt 100, a ratio of the thickness h2 of the first compression rubber layer 111 with respect to the entire thickness H of the wrapped V-belt 100 is from 15 to 25% (preferably 20 to 25%). In this configuration, it is possible to more reliably form notch portions 170 which will be described later such that the top thereof is disposed in the fabric-laminated body layer 120, and also it is possible to increase rigidity of the compression layer 110. Here, the thickness h3 of the fabric-laminated body layer 120 can be obtained by subtracting the thickness h2 of the first compression rubber layer 111 from the total thickness h1 of the first compression rubber layer 111 and the fabric-laminated body layer 120. The total thickness h1 of the first compression rubber layer 111 and the fabric-laminated body layer 120 can be also regarded as a thickness from the belt inner surface 102 to the fabric-laminated body layer 120 (end portion on the belt outer surface side of the fabric-laminated body layer 120). In addition, the above-described H and h0 to h2 are thicknesses including the outside cloth 160 on the belt inner surface side.

The tension member 140 is buried between the compression layer 110 and the tension rubber layer 130. Although not being particularly limited, the tension member 140 is generally formed of core wires (twisted cords) 141 arranged at a predetermined interval in the belt width direction. As the fiber that configures the core wire 141, in terms of high modulus, synthetic fiber such as polyester fiber in which C2-4 alkylene arylate such as ethylene terephthalate or ethylene-2,6-naphthalate is used as a main configuration unit (polyalkylene arylate fiber, polyethylene terephthalate fiber, ethylene naphthalate fiber, or the like) and aramid fiber, and inorganic fiber such as carbon fiber can be used, and polyester fiber or aramid fiber is preferable. These fibers may be multifilament yarn. Fineness of the multifilament yarn may be from 2000 to 10000 denier, and is preferably from 4000 to 8000 denier.

As the core wire 141, twisted cord in which the multifilament yarn is used (organzine, single twist, lang lay, or the like) is used in many cases, and an average wire diameter of the core wire 141 (fiber diameter of twisted cord) may be from 0.5 to 3 mm, preferably from 0.6 to 2 mm, and more preferably from 0.7 to 1.5 mm. The core wire 141 is buried to extend in the belt circumferential direction with a certain interval in the belt width direction. In this embodiment, one core wire 141 is buried by winding it plural times (in the example of FIG. 1, 8 times) in a spiral shape in the belt circumferential direction.

In order to increase adhesiveness between the compression layer 110 and the tension rubber layer 130, and the tension member 140, the core wire 141 may be subjected to an adhesion treatment such as an RFL treatment. In the RFL treatment, the fiber to configure the core wire 141 is immersed in the resorcinol formaldehyde latex (RFL) liquid and then, dried by heating, thereby, an adhesive layer can be formed uniformly on the surface of the fiber. Latex of the RFL liquid can include diene rubber (natural rubber, isoprene rubber, butadiene rubber, chloroprene rubber, styrene butadiene rubber, styrene-butadiene-vinylpyridine terpolymer, acrylonitrile-butadiene rubber, hydrogenated nitrile rubber, or the like), ethylene-α-olefin elastomer, chlorosulfonated polyethylene rubber, alkylated chlorosulfonated polyethylene rubber, or the like. These types of latex may be used independently or in combination of two or more types thereof. After performing a pre-treatment (pre-dip) by a reactive compound such as an epoxy compound or isocyanate compound before the RFL processing, or a rubber cement treatment (over-coating) after the RFL processing or the like with respect to the fiber to configure the core wire 141, the core wire 141 may be buried between the compression layer 110 and the tension rubber layer 130.

In order to improve adhesiveness between the tension member 140, and the tension rubber layer 130 and the compression layer 110, an adhesive rubber layer may be disposed between the tension rubber layer 130 and the compression layer 110. In this case, the rubber composition to form the adhesive rubber layer is blended in a similar manner to the rubber composition of the compression layer 110 or the tension rubber layer 130. Specifically, into a rubber component (chloroprene rubber or the like), vulcanizing agent or cross-linking agent (metal oxide such as magnesium oxide or zinc oxide, sulfuric vulcanizing agent, such as powder sulfur or the like), co-cross-linking agent (maleimide cross-linking agent such as N,N'-m-phenylenedimaleimide or the like), vulcanization accelerator (TMTD, DPTT, CBS, or the like), enhancer (carbon black, silicon oxide or the like), filler (clay, calcium carbonate, talc, mica, or the like), softener (oil such as naphthene oil), finishing agent or auxiliary finishing agent (stearic acid, metal stearate, wax, paraffin, or the like), anti-aging agent, coloring agent, tackifier, plasticizer, coupling agent (silane coupling agent or the like), stabilizer (ultraviolet absorber, thermal stabilizer or the like), flame retardant, antistatic agent, or the like may be blended to form the rubber composition, and adhesiveness improving agent may be further blended thereto to form the rubber composition. In addition, the rubber composition which forms the adhesive rubber layer may be the same as or may be different from the rubber composition which forms the first compression rubber layer 111 and the second compression rubber layer 112 of the compression layer 110 or the tension rubber layer 130.

The outside cloth 160 is formed of a fiber material obtained by weaving warp and weft, which are made of yarn of a synthetic fiber such as polyester, polyamide, aramid, or vinylon or of natural fiber such as cotton, or a blended yarn thereof, by plain weave, twill weave, or satin weave at an intersecting angle of 90° or greater than 90°. The fiber used in the outside cloth 160 is selected in accordance with the use, but generally, cotton is the most preferable from the viewpoint of cost, general-purpose properties, and water absorbency.

The compression layer 110 includes the plurality of notch portions 170. The notch portions 170 are formed to extend in the belt width direction to be open to the belt inner surface side (that is, the belt inner surface 102) of the compression layer 110, and are disposed to be aligned in the belt circumferential direction. The notch portion 170 is formed after covering the belt main body 150 with the outside cloth 160 and vulcanization-forming, by punching a part of the compression layer 110 in the belt width direction by a mechanical processing together with the outside cloth 160. Accordingly, as illustrated in (B) of FIG. 1, the inner surface of the notch portion 170 is not covered with the outside cloth 160, and the first compression rubber layer 111 and the fabric-laminated body layer 120 are exposed. Here, the notch portions 170 are formed such that their top positions ("notch top position" illustrated by one-dot chain line in FIG. 1) are positioned on the fabric-laminated body layer 120 of the compression layer 110. Here, the top of the notch portion 170 means a part which is positioned on the most belt outer surface side among the notch portions 170 in the belt thickness direction.

The notch portions 170 are formed such that in the belt thickness direction of the wrapped V-belt 100, the height h0 from the belt inner surface 102 to the top of the notch portion 170 is greater than the thickness h2 of the first compression rubber layer 111, and smaller than the total thickness h1 of the first compression rubber layer 111 and the fabric-laminated body layer 120. The relationship of h0, h1 and h2 is preferably $1.2h2 \leq h0 \leq 0.95h1$. Furthermore, the notch portions 170 are not formed on at least one (1 sheet) or more layers on the belt outer surface side in the laminated fabric 121 that forms the fabric-laminated body layer 120. In other words, the notch portions 170 are formed such that at least one (1 sheet) or more layers of the laminated fabric 121 that forms the fabric-laminated body layer 120 remain unpunched. In this configuration, it is possible to sufficiently ensure the fabric 121 of the fabric-laminated body layer 120 which serves a reinforcing layer at the top of the notch portion 170.

In the case of setting the entire thickness of the wrapped V-belt 100 to from 5 to 20 mm and the length to from 20 to 400 inches (from 508 to 10,160 mm) as described above, it is preferable that the notch portion 170 is formed such that the height (distance h0 from the belt inner surface 102 on the belt inner surface side to the position of the top of the notch portion) is from 3.0 to 9.0 mm, an interval (pitch) is from 7 to 25 mm and a radius of curvature R of a curve portion is from 1.0 to 5.0 mm.

[Method for Manufacturing Wrapped V-Belt]

Next, a manufacturing method for manufacturing the wrapped V-belt 100 according to the first embodiment will be described. The manufacturing method for manufacturing the wrapped V-belt 100 according to the first embodiment contains the following processes.

First, the rubber composition 122-attached fabric (precursor) 121 is made by performing any treatment of the above-described (1) to (4) with respect to the fabric 121 adjusted to a predetermined dimension. Then, a predetermined number of precursors are laminated and subjected to a press-bonding by a roller or the like, to thereby form the fabric laminated body.

Next, the unvulcanized rubber composition sheet to be the first compression rubber layer 111, the fabric-laminated body to be the fabric-laminated body layer 120 in which the plurality of pieces of the rubber composition 122-attached fabric 121 are laminated, the unvulcanized rubber composition sheet to be the second compression rubber layer 112, the core wire 141 to form the tension member 140, and the unvulcanized rubber sheet to be the tension rubber layer 130 are wound around a forming drum in this order, to thereby prepare a formed body.

Next, the formed body is processed into the belt main body 150 by cutting to have a predetermined width and by cutting to have a V shape in a section in the belt width direction. Thereafter, the outside cloth 160 is wound around the belt main body 150 and vulcanization is performed, to thereby prepare the wrapped V-belt configured of the compression layer 110 in which the first compression rubber layer 111, the fabric-laminated body layer 120 and the second compression rubber layer 112 are disposed from the belt inner surface side to the belt outer surface side, the tension rubber layer 130 disposed on the belt outer surface side, and the tension member 140 disposed between the compression layer 110 and the tension rubber layer 130. Accordingly, the wrapped V-belt which contains: the belt main body 150 configured of the compression layer 110 in which the first compression rubber layer 111, the fabric-laminated body layer 120 and the second compression rubber layer 112 are disposed from the belt inner surface side to the belt outer surface side, the tension rubber layer 130 disposed on the belt outer surface side, and the tension member 140 disposed between the compression layer 110 and the tension rubber layer 130; and the outside cloth 160 which covers the periphery of the belt main body 150 over the entire length in the belt circumferential direction, is prepared.

And then, with respect to the obtained wrapped V-belt, the notch portions 170 formed to extend in the belt width direction to be open on the belt inner surface side of the compression layer 110, and disposed to be aligned in the belt circumferential direction, in which the top positioned on the most belt outer surface side is disposed in the fabric-laminated body layer 120, are formed. For example, the notch portions 170 are formed by a punching performed by a mechanical processing. From the above, the wrapped V-belt 100 according to the first embodiment can be manufactured.

As described above, according to the wrapped V-belt 100 and the method for manufacturing the wrapped V-belt 100 according to the first embodiment, the outside cloth 160 covers the periphery of the belt main body 150 over the entire length except for the notch portions 170. In other words, since the notch portions 170 are not covered with the outside cloth 160, the first compression rubber layer 111 and the fabric-laminated body layer 120 are exposed. Here, at the top of the notch portion 170, positioned on the most belt outer surface side in the belt thickness direction, a deforming stress in the belt circumferential direction is locally concentrated when deformation of the shape of the notch portions 170 following the bending of the belt is continuously repeated. In addition, the top of the notch portion 170 is disposed in the fabric-laminated body layer 120. In other words, in the notch portions 170, the top at which the deforming stress in the belt circumferential direction is locally concentrated is disposed in the fabric-laminated body layer 120. Therefore, at the top of the notch portions 170 at which the deforming stress in the belt circumferential direction is locally concentrated when the belt is bent, the fabric 121 in the fabric-laminated body layer 120 serves a reinforcing layer, and thus, it is possible to suppress generation of cracks in the notch portions 170. In other words, it is possible to improve crack resistance of the notch portions.

In addition, the fabric-laminated body serving the fabric-laminated body layer 120 is one obtained by laminating the rubber composition 122-attached fabric 121. Therefore, at the time of vulcanizing the formed body to be the wrapped V-belt 100, in accordance with a vulcanization reaction of the rubber composition 122, adhesion (integral lamination) of the fabric pieces 121 to each other, and further, of the fabric-laminated body layer 120 and the periphery (the first compression rubber layer 111 and the second compression rubber layer 112, or the outside cloth 160) can be easily and reliably performed. In other words, it is possible to increase rigidity of the fabric-laminated body layer 120. From the above, it is possible to improve crack resistance of the notch portions 170.

Furthermore, in the compression layer 110, from the belt inner surface side to the belt outer surface side, the first compression rubber layer 111, the fabric-laminated body layer 120 and the second compression rubber layer 112 are disposed in this order. Therefore, it is possible to dispose the fabric-laminated body layer 120 in accordance with the length (depth) of the notch portions 170 in the belt thickness direction. In other words, it is possible to more reliably form the notch portions 170 such that the top thereof is disposed in the fabric-laminated body layer 120. From the above, it is possible to more reliably suppress generation of cracks in the notch portions 170. In addition, it is possible to improve crack resistance of the notch portions 170.

<Second Embodiment>

[Wrapped V-Belt]

Next, based on FIG. 2, a wrapped V-belt according to a second embodiment will be described. The same parts as those of the wrapped V-belt according to the first embodiment will be given the same reference numerals as those of the wrapped V-belt according to the first embodiment, and descriptions thereof will be omitted. Specifically, in a wrapped V-belt 200 according to the second embodiment, configurations of a compression layer 210 and notch portions 270 are different from the configurations of the compression layer 110 and the notch portions 170 of the wrapped V-belt 100 according to the first embodiment and thus, they will be described.

The compression layer 210 contains a compression rubber layer 211 and a fabric-laminated body layer 220. The compression layer 210 is configured of the fabric-laminated body layer 220 in which a plurality of pieces of a rubber composition 222-attached fabric 221 are laminated and adhered to each other and the compression rubber layer 211 laminated from the belt inner surface side to the belt outer surface side.

The compression rubber layer 211 is formed of a rubber composition. The rubber composition of the compression rubber layer 211 is the same as the rubber composition of the first compression rubber layer 111 and the second compression rubber layer 112 of the first embodiment, and descriptions thereof will be omitted.

The fabric-laminated body layer 220 is formed as a laminated layer in which the plurality of pieces of the rubber composition 222-attached fabric 221 are laminated and adhered to each other. The fabric 221 and the rubber composition 222 are the same as the fabric 121 and the rubber composition 122 of the fabric-laminated body layer 120 according to the first embodiment, and descriptions thereof will be omitted.

As illustrated in (B) of FIG. 2, the compression layer 210 is formed such that a ratio of the thickness h3 of the fabric-laminated body layer 220 with respect to the entire thickness H of the wrapped V-belt 200 is from 45 to 65% (preferably from 45 to 55%) in the belt thickness direction of the wrapped V-belt 200. In this configuration, it is possible to more reliably form the notch portions 270 which will be described later such that the top thereof is disposed in the fabric-laminated body layer 220, and also it is possible to increase rigidity of the compression layer 210. Here, the thickness h3 of the fabric-laminated body layer 220 is the same as the thickness h1 from the belt inner surface 102 to the fabric-laminated body layer 220 (end portion on the belt outer surface side of the fabric-laminated body layer 220). The above-described H, h0 and h3 are thicknesses including the outside cloth 160 on the belt inner surface side.

The compression layer 210 includes the plurality of notch portions 270. The notch portions 270 are formed to extend in the belt width direction to be open to the belt inner surface 102 on the belt inner surface side of the compression layer 210, and are disposed to be aligned in the belt circumferential direction. The notch portion 270 is formed after covering the belt main body 150 with the outside cloth 160 and vulcanization-forming, by punching a part of the compression layer 210 in the belt width direction by a mechanical processing together with the outside cloth 160. Accordingly, as illustrated in (B) of FIG. 2, the inner surface of the notch portion 270 is not covered with the outside cloth 160, and the fabric-laminated body layer 220 is exposed. Here, the notch portions 270 are formed such that their top positions ("notch top position" illustrated by one-dot chain line in FIG. 2) are positioned on the fabric-laminated body layer 220 of the compression layer 210. Here, the top of the notch portion 270 means a part positioned on the most belt outer surface side among the notch portions 270 in the belt thickness direction.

The notch portions 270 are formed such that in the belt thickness direction of the wrapped V-belt 200, the height h0 to the top of the notch portion 270 is smaller than the thickness h3 of the fabric-laminated body layer 220. Furthermore, the notch portions 270 are not formed on at least one (1 sheet) or more layers on the belt outer surface side in the laminated fabric 221 that forms the fabric-laminated body layer 220. In other words, the notch portions 270 are formed such that at least one (1 sheet) or more layers of the laminated fabric 221 that forms the fabric-laminated body layer 220 remain unpunched. In this configuration, it is possible to sufficiently ensure the fabric 221 of the fabric-laminated body layer 220 which serves a reinforcing layer at the top of the notch portion 270.

[Method for Manufacturing Wrapped V-Belt]

Next, a manufacturing method for manufacturing the wrapped V-belt 200 according to the second embodiment will be described. The manufacturing method for manufacturing the wrapped V-belt 200 according to the second embodiment contains the following processes.

First, the rubber composition 222-attached fabric (precursor) 221 is made by performing any treatment of the above-described (1) to (4) with respect to the fabric 221 adjusted to a predetermined dimension. Then, a predetermined number of precursors are laminated and subjected to a press-bonding by a roller or the like, to thereby form the fabric laminated body.

Next, the fabric-laminated body to be the fabric laminated body layer 220 in which the plurality of pieces of the rubber composition 222-attached fabric 221 are laminated, the unvulcanized rubber composition sheet to be the compression rubber layer 211, the core wire 141 to form the tension member 140, and the unvulcanized rubber sheet to be the tension rubber layer 130 are wound around a forming drum in this order, to thereby prepare a formed body.

Next, the formed body is processed into the belt main body 150 by cutting to have a predetermined width and by cutting to have a V shape in a section in the belt width direction. Thereafter, the outside cloth 160 is wound around the belt main body 150 and vulcanization is performed, to thereby prepare the wrapped V-belt configured of the compression layer 210 in which the fabric-laminated body layer 220 and the compression rubber layer 211 are disposed from the belt inner surface side to the belt outer surface side, the tension rubber layer 130 disposed on the belt outer surface side and the tension member 140 disposed between the compression layer 210 and the tension rubber layer 130. Accordingly, the wrapped V-belt which contains: the belt main body 150 configured of the compression layer 210 in which the fabric-laminated body layer 220 and the compression rubber layer 211 are disposed from the belt inner surface side to the belt outer surface side, the tension rubber layer 130 disposed on the belt outer surface side and the tension member 140 disposed between the compression layer 210 and the tension rubber layer 130; and the outside cloth 160 which covers the periphery of the belt main body 150 over the entire length in the belt circumferential direction, is prepared.

And then, with respect to the obtained wrapped V-belt, the notch portions 270 formed to extend in the belt width direction and disposed to be aligned in the belt circumferential direction are formed on the belt inner surface side of the compression layer 210 such that the top positioned on the most belt outer surface side is disposed in the fabric-laminated body layer 220. For example, the notch portions 170 are formed by a punching performed by a mechanical processing. From the above, the wrapped V-belt 200 according to the second embodiment can be manufactured.

As described above, according to the wrapped V-belt 200 and the method for manufacturing the wrapped V-belt 200 according to the second embodiment, the outside cloth 160 covers the periphery of the belt main body 150 over the entire length except for the notch portions 270. In other words, since the notch portions 270 are not covered with the outside cloth 160, the fabric-laminated body layer 220 is exposed. Here, at the top of the notch portion 270, positioned on the most belt outer surface side, a deforming stress in the belt circumferential direction is locally concentrated when deformation of the shape of the notch portions 270 following the bending of the belt is continuously repeated. In addition, the top of the notch portion 270 is disposed in the fabric-laminated body layer 220. In other words, in the notch portions 270, the top at which the deforming stress in the belt circumferential direction is locally concentrated is disposed in the fabric-laminated body layer 220. Therefore, at the top of the notch portions 270 at which the deforming stress is locally concentrated when the belt is bent, the fabric 221 in the fabric-laminated body layer 220 serves a reinforcing layer, and thus, it is possible to suppress generation of cracks in the notch portions 270. In addition, the top of the notch portion 270, positioned on the most belt outer surface side, tends to intensively receive also a deforming stress in the belt width direction due to a lateral pressure which a frictional power transmission surface that is both belt side surfaces receives from the pulley. In addition, the belt inner surface side is configured of the fabric-laminated body layer 220. Therefore, rigidity of the compression layer 210 is increased, lateral pressure resistance with respect to the pulley is excellent and it is hard to receive the deforming stress in the belt width direction, and thus, it is possible to suppress the generation of cracks in the notch portions 270. Therefore, it is possible to improve crack resistance of the notch portions 270.

In addition, the fabric-laminated body to be the fabric-laminated body layer 220 is one obtained by laminating the rubber composition 222-attached fabric 221. Therefore, at the time of vulcanizing the formed body to be the wrapped V-belt 200, in accordance with a vulcanization reaction of the rubber composition 222, adhesion (integral lamination) of the fabric pieces 221 to each other, and further, of the fabric-laminated body layer 220 and the periphery (the compression rubber layer 211 or the outside cloth 160) can be easily and reliably performed. In other words, it is possible to increase rigidity of the fabric-laminated body layer 220. From the above, it is possible to suppress the generation of cracks in the notch portions 270. In addition, it is possible to improve crack resistance of the notch portions 270.

Furthermore, in the wrapped V-belt 200 according to the second embodiment, the number of compression rubber layers is smaller by one layer than that of the wrapped V-belt 100 according to the first embodiment, and in the method for manufacturing the wrapped V-belt 200 according to the second embodiment, the manufacturing of the wrapped V-belt 200 is easier than that in the method for manufacturing the wrapped V-belt 100 according to the first embodiment since the number of the unvulcanized rubber sheets wound around the forming drum is smaller by one layer.

Above, the embodiments of the present invention are described based on the drawings, but it should be considered that a specific configuration is not limited to these embodiments and examples. The scope of the present invention is illustrated not only by the description of the above-described embodiments and examples, but also by the scope of the claims, and further, includes all changes within the meaning and the scope which are equivalent to the scope of the claims.

For example, in the method for manufacturing the wrapped V-belt 100 according to the first embodiment, in advance, the rubber composition 122-attached fabric (precursor) 121 is prepared by performing any treatment of the above-described (1) to (4) with respect to the fabric 121 adjusted to a predetermined dimension, a predetermined number of the precursors are laminated and subjected to a press-bonding by a roller or the like to form the fabric-laminated body, and then, the unvulcanized rubber composition sheet to be the first compression rubber layer 111, the fabric-laminated body to be the fabric-laminated body layer 120 in which the plurality of pieces of the rubber composition 122-attached fabric 121 are laminated, the unvulcanized rubber composition sheet to be the second compression rubber layer 112, the core wire 141 to form the tension member 140, and the unvulcanized rubber sheet to be the tension rubber layer 130 are wound around a forming drum in this order to form the formed body. However, the invention is not limited thereto. For example, in advance, the rubber composition 122-attached fabric (precursor) 121 is prepared by performing any treatment of the above-described (1) to (4) with respect to the fabric 121 adjusted to a predetermined dimension, and then, without laminating a predetermined number of precursors and subjected to a press-bonding by a roller or the like to form the fabric-laminated body, the formed body may be prepared by winding the unvulcanized rubber composition sheet to be the first compression rubber layer 111, the fabric-laminated body to be the fabric-laminated body layer 120 in which the rubber composition 122-attached fabric 121 is continuously wound predetermined times to be a plurality of laminated layers, the unvulcanized rubber composition sheet to be the second compression rubber layer 112, the core wire 141 to form the tension body 140, and the unvulcanized rubber sheet to be the tension rubber layer 130, around the forming drum in this order. The same is applied to the method for manufacturing the wrapped V-belt 200 according to the second embodiment.

In addition, the compression rubber layer 113 of the wrapped V-belt 100 according to the first embodiment includes two compression rubber layers (the first compression rubber layer 111 and the second compression rubber layer 112). However, the compression rubber layer 113 may include three or more compression rubber layers. In addition, the fabric-laminated body layer 120 may also include a plurality of fabric-laminated body layers. In this case, the compression layer 110 has a configuration in which the compression rubber layer and the fabric-laminated body layer are alternately laminated from the belt inner surface side to the belt outer surface side.

EXAMPLES

Next, the wrapped V-belts according to the present examples will be described. In the present examples, as Examples 1 to 5, the wrapped V-belts 100 according to the first embodiment were prepared by the method for manufacturing a wrapped V-belt according to the first embodiment. As Examples 6 to 10, the wrapped V-belts 200 according to the second embodiment were prepared by the method for manufacturing a wrapped V-belt according to the second embodiment. In addition, as Comparative Examples 1 and 2, as conventional wrapped V-belts, wrapped V-belts in which the belt main body is configured only of a compression rubber layer, an tension rubber layer and a tension member, and the periphery of the V-shaped section of the belt main body is covered with an outside cloth over an entire length in the belt circumferential direction, were prepared.

As the rubber composition of the first compression rubber layer 111, the second compression rubber layer 112, and the tension rubber layer 130 in Examples 1 to 5, the compression rubber layer 211 and the tension rubber layer 130 in Examples 6 to 10 and the compression rubber layer and the tension rubber layer in the Comparative Examples, the rubber composition described in the following Table 1 was used.

TABLE 1

| Component | Mass parts |
| --- | --- |
| Chloroprene rubber | 100 |
| Magnesium oxide | 4 |
| Stearic acid | 1 |
| Anti-aging agent | 4 |
| Carbon black | 30 |
| Plasticizer | 5 |
| Vulcanization accelerator | 1 |
| Zinc oxide | 5 |
| Polyamide 6 short fiber | 5 |
| Cotton short fiber | 10 |

In Examples and Comparative Examples, a twisted cord of PET (polyethylene terephthalate) fiber was used as the core wire.

In Examples and Comparative Examples, as the outside cloth, a woven fabric of plain weave to which a friction treatment was performed after performing an RFL treatment, was used. Here, in the woven fabric of plain weave used as the outside cloth, a spun yarn of cotton having a yarn count of 20 in thickness was used as the warp and the weft, and the density of the warp and the weft was set to 75/5 cm. As the rubber composition for the friction treatment, the rubber composition described in the following Table 2 was used. As the precursor of the fabric-laminated body of Examples, the same one as that of the outside cloth was used.

TABLE 2

| Component | Mass parts |
| --- | --- |
| Chloroprene rubber | 100 |
| Magnesium oxide | 4 |
| Stearic acid | 1 |
| Anti-aging agent | 4 |
| Carbon black | 30 |
| Plasticizer | 5 |

TABLE 2-continued

| Component | Mass parts |
| --- | --- |
| Vulcanization accelerator | 1 |
| Zinc oxide | 5 |

The dimension of the wrapped V-belts in Examples and Comparative Examples will be described. In Examples 1 to 4, 6 to 9 and Comparative Example 1, the entire thickness of the wrapped V-belt (hereinafter, referred to as "belt thickness H") was set to 10.9 mm, and the length (belt length) was set to 60 inches (1,524 mm). In addition, the depth of the notch portion was set to 4.0 mm, the interval of the notch portion (pitch) was set to 9.0 mm and the radius of curvature R of the curve portion of the notch portion was set to 2.0 mm.

In addition, in the wrapped V-belt of Example 1, the thickness h2 of the first compression rubber layer 111 was set to 2.7 mm (belt thickness H×25%), and the total thickness of the first compression rubber layer 111 and the fabric-laminated body layer 120 (thickness from the belt inner surface to the fabric-laminated body layer 120) h1 was set to 4.9 mm (belt thickness H×45%). In other words, in the wrapped V-belt of Example 1, the thickness of the fabric-laminated body layer 120 is 2.2 mm, and the difference between the total thickness h1 of the first compression rubber layer 111 and the fabric-laminated body layer 120 and the depth of the notch portion is 0.9 mm.

In addition, in the wrapped V-belt of Example 2, the thickness h2 of the first compression rubber layer 111 was set to 2.5 mm (belt thickness H×23%), and the total thickness of the first compression rubber layer 111 and the fabric-laminated body layer 120 (thickness from the belt inner surface to the fabric-laminated body layer 120) h1 was set to 5.5 mm (belt thickness H×50%). In other words, in the wrapped V-belt of Example 2, the thickness of the fabric-laminated body layer 120 is 3.0 mm, and the difference between the total thickness h1 of the first compression rubber layer 111 and the fabric-laminated body layer 120 and the depth of the notch portion is 1.5 mm.

In addition, in the wrapped V-belt of Example 3, the thickness h2 of the first compression rubber layer 111 was set to 2.2 mm (belt thickness H×20%), and the total thickness of the first compression rubber layer 111 and the fabric-laminated body layer 120 (thickness from the belt inner surface to the fabric-laminated body layer 120) h1 was set to 6.0 mm (belt thickness H×55%). In other words, in the wrapped V-belt of Example 3, the thickness of the fabric-laminated body layer 120 is 3.8 mm, and the difference between the total thickness h1 of the first compression rubber layer 111 and the fabric-laminated body layer 120 and the depth of the notch portion is 2.0 mm.

In addition, in the wrapped V-belt of Example 4, the thickness h2 of the first compression rubber layer 111 was set to 2.0 mm (belt thickness H×18%), and the total thickness of the first compression rubber layer 111 and the fabric-laminated body layer 120 (thickness from the belt inner surface to the fabric-laminated body layer 120) h1 was set to 6.5 mm (belt thickness H×60%). In other words, in the wrapped V-belt of Example 4, the thickness of the fabric-laminated body layer 120 is 4.5 mm, and the difference between the total thickness h1 of the first compression rubber layer 111 and the fabric-laminated body layer 120 and the depth of the notch portion is 2.5 mm.

In addition, in the wrapped V-belt of Example 6, the thickness h3 of the fabric-laminated body layer 220 (thickness h1 from the belt inner surface to the fabric-laminated body layer 220) was set to 4.9 mm (belt thickness H×45%). In other words, in the wrapped V-belt of Example 6, the difference between the thickness h3 of the fabric-laminated body layer 220 and the depth of the notch portion is 0.9 mm.

In addition, in the wrapped V-belt of Example 7, the thickness of the fabric-laminated body layer 220 (thickness from the belt inner surface to the fabric-laminated body layer 220) h3 was set to 5.5 mm (belt thickness H×50%). In other words, in the wrapped V-belt of Example 7, the difference between the thickness h3 of the fabric-laminated body layer 220 and the depth of the notch portion is 1.5 mm.

In addition, in the wrapped V-belt of Example 8, the thickness h3 of the fabric-laminated body layer 220 (thickness h1 from the belt inner surface to the fabric-laminated body layer 220) was set to 6.0 mm (belt thickness H×55%). In other words, in the wrapped V-belt of Example 8, the difference between the thickness h3 of the fabric-laminated body layer 220 and the depth of the notch portion is 2.0 mm.

In addition, in the wrapped V-belt of Example 9, the thickness h3 of the fabric-laminated body layer 220 (thickness h1 from the belt inner surface to the fabric-laminated body layer 220) was set to 6.5 mm (belt thickness H×60%). In other words, in the wrapped V-belt of Example 9, the difference between the thickness h3 of the fabric-laminated body layer 220 and the depth of the notch portion is 2.5 mm.

In Examples 5, 10 and Comparative Example 2, the entire thickness of the wrapped V-belt (belt thickness) was set to 23.0 mm, and the length (belt length) was set to 100 inches (2,540 mm). In addition, the depth of the notch portion (notch depth) was set to 13.0 mm, the interval of the notch portion (notch pitch) was set to 21.0 mm and a radius of curvature R of the curve portion of the notch portion was set to 4.0 mm. Here, the depth of the notch portion means the length of the notch portion in the belt thickness direction.

In addition, in the wrapped V-belt of Example 5, the thickness h2 of the first compression rubber layer 111 was set to 3.5 mm (belt thickness H×15%), and the total thickness of the first compression rubber layer 111 and the fabric-laminated body layer 120 (thickness from the belt inner surface to the fabric-laminated body layer 120) h1 was set to 15.0 mm (belt thickness H×65%). In other words, in the wrapped V-belt of Example 5, the thickness of the fabric-laminated body layer 120 is 11.5 mm, and the difference between the total thickness h1 of the first compression rubber layer 111 and the fabric-laminated body layer 120 and the depth of the notch portion is 2.0 mm.

In addition, in the wrapped V-belt of Example 10, the thickness h3 of the fabric-laminated body layer 220 (thickness h1 from the belt inner surface to the fabric-laminated body layer 220) was set to 15.0 mm (belt thickness H×65%). In other words, in the wrapped V-belt of Example 10, the difference between the thickness h3 of the fabric-laminated body layer 220 and the depth of the notch portion is 2.0 mm.

[Bending Fatigue Test]

The bending fatigue test (in accordance with JIS K 6323(2008) "V-belt for general purposes") was performed by mounting the wrapped V-belts of Examples and Comparative Examples to a travel tester illustrated in FIG. 3 and rotating them, and travel time until cracks are generated at the top of the notch portion was measured for each.

Here, the bending fatigue test was performed under the following two types of bending fatigue test conditions A and B. With respect to the wrapped V-belts of Examples 1 to 4, 6 to 9 and Comparative Example 1, the bending fatigue test was performed by mounting the wrapped V-belt to a travel tester illustrated in (A) of FIG. 3 and rotating it as the bending fatigue test condition A. Here, in the travel tester illustrated in (A) of FIG. 3, a pulley diameter φ of a driving pulley Dr was set to 80 mm, a pulley diameter φ of a driven pulley Dn was set to 100 mm, and a deadweight DW attached to the driven pulley Dn was set to 80 kgf. In addition, in the travel tester illustrated in (A) of FIG. 3, the rotation number of the driving pulley Dr was set to 3600 rpm, the atmospheric temperature was set to 23° C., and the bending fatigue test of the wrapped V-belts of Examples 1 to 4, 6 to 9 and Comparative Example 1 was performed. In addition, with respect to the wrapped V-belts of Examples 5, 10 and Comparative Example 2, the bending fatigue test was performed by mounting the wrapped V-belt to a travel tester illustrated in (B) of FIG. 3 and rotating it as the bending fatigue test condition B. Here, in the travel tester illustrated in (B) of FIG. 3, the pulley diameter of the driving pulley Dr was set to 315 mm, the pulley diameter φ of the driven pulley Dn was set to 315 mm, the load of the driving pulley Dr was set to 30 ps, and an axial load of the driven pulley Dn was set to be 500 kgf. In addition, in the travel tester illustrated in (B) of FIG. 3(B), the rotation number of the driving pulley Dr was set to 1800 rpm, the atmospheric temperature was set to 23° C., and the bending fatigue test of the wrapped V-belts of Examples 5, 10 and Comparative Example 2 was performed.

The dimension of the wrapped V-belts of Examples and Comparative Examples and the test results of the bending fatigue test, are shown in Table 3.

TABLE 3

| | | Ex. 1 | Ex. 2 | Ex. 3 | Ex. 4 | Ex. 5 | Ex. 6 | Ex. 7 | Ex. 8 | Ex. 9 | Ex. 10 | Comp. Ex. 1 | Comp. Ex. 2 |
|---|---|---|---|---|---|---|---|---|---|---|---|---|---|
| Belt length | inch | 60 | 60 | 60 | 60 | 100 | 60 | 60 | 60 | 60 | 100 | 60 | 100 |
| Belt thickness | (H) mm | 10.9 | 10.9 | 10.9 | 10.9 | 23.0 | 10.9 | 10.9 | 10.9 | 10.9 | 23.0 | 10.9 | 23.0 |
| Notch depth | mm | 4.0 | 4.0 | 4.0 | 4.0 | 13.0 | 4.0 | 4.0 | 4.0 | 4.0 | 13.0 | 4.0 | 13.0 |
| Notch pitch | mm | 9.0 | 9.0 | 9.0 | 9.0 | 21.0 | 9.0 | 9.0 | 9.0 | 9.0 | 21.0 | 9.0 | 21.0 |
| Radius of curvature R of notch | mm | 2.0 | 2.0 | 2.0 | 2.0 | 4.0 | 2.0 | 2.0 | 2.0 | 2.0 | 4.0 | 2.0 | 4.0 |
| Thickness of first compression rubber layer | (h2) mm | 2.7 (H × 25%) | 2.5 (H × 23%) | 2.2 (H × 20%) | 2.0 (H × 18%) | 3.5 (H × 15%) | — | — | — | — | — | — | — |
| Thickness from belt inner surface to fabric-laminated body layer | (h1) mm | 4.9 (H × 45%) | 5.5 (H × 50%) | 6.0 (H × 55%) | 6.5 (H × 60%) | 15.0 (H × 65%) | 4.9 | 5.5 | 6.0 | 6.5 | 15.0 | | |

TABLE 3-continued

|  |  | Ex. 1 | Ex. 2 | Ex. 3 | Ex. 4 | Ex. 5 | Ex. 6 | Ex. 7 | Ex. 8 | Ex. 9 | Ex. 10 | Comp. Ex. 1 | Comp. Ex. 2 |
|---|---|---|---|---|---|---|---|---|---|---|---|---|---|
| Thickness of fabric-laminated body layer | (h3) mm | 2.2 (H × 45%) | 3.0 (H × 50%) | 3.8 (H × 55%) | 4.5 (H × 60%) | 11.5 (H × 65%) | 4.9 | 5.5 | 6.0 | 6.5 | 15.0 |  |  |
| (h1) - notch depth | mm | 0.9 | 1.5 | 2.0 | 2.5 | 2.0 | 0.9 | 1.5 | 2.0 | 2.5 | 2.0 | — | — |
| Bending fatigue test condition |  | A | A | A | A | B | A | A | A | A | B | A | B |
| Bending fatigue test (until cracks are generated) | (Hr) | 509 | 531 | 539 | 498 | 239 | 623 | 655 | 667 | 608 | 268 | 358 | 138 |

[Evaluation of Crack Resistance]

Based on the results of the bending test performed under the same bending fatigue test condition, shown in Table 3, the crack resistance was evaluated. As a result, it is ascertained that, in the wrapped V-belts of Examples 1 to 4 and 6 to 9 to which the bending test was performed under the bending fatigue test condition A, the time period until cracks are generated was much longer than that of the wrapped V-belt of Comparative Example 1. In addition, it is ascertained that, in the wrapped V-belts of Examples 5 and 10 to which bending test was performed under the bending fatigue test condition B, the time period until cracks are generated was much longer than that of the wrapped V-belt of Comparative Example 2. It is considered that this is because, while the rubber composition is exposed on the inner surface of the notch portion in the wrapped V-belts of Comparative Examples, the vicinity of the top of the notch portion is reinforced by the fabric-laminated body layer in the wrapped V-belts of Examples.

In addition, the wrapped V-belts of Example 1 and Example 6, the wrapped V-belts of Example 2 and Example 7, the wrapped V-belts of Example 3 and Example 8, the wrapped V-belts of Example 4 and Example 9, and the wrapped V-belts of Example 5 and Example 10 are the same with each other in the belt length, belt thickness, notch depth, notch pitch, radius of curvature R of notch, and thickness h1 from the belt inner surface to the fabric-laminated body layer. However, it is ascertained that the time period until cracks are generated was longer in the wrapped V-belts of Examples 6 to 10 than that of the wrapped V-belts of Examples 1 to 5. It is considered that this is because, while the belt inner surface side of the compression layer 110 is the first compression rubber layer 111 formed of the rubber composition in the wrapped V-belts in Examples 1 to 5, in the wrapped V-belts of Examples 6 to 10, since the belt inner surface side of the compression layer 210 is the fabric-laminated body layer 220, rigidity of the compression layer is high and lateral pressure resistance with respect to pulley is excellent, thereby receiving less bending deformation (dishing), and thus, the time period until cracks are generated got longer.

Furthermore, it is ascertained that the time period until cracks are generated in the wrapped V-belts of Examples 1 to 3 was longer than that in wrapped V-belt of Example 4. It is considered that this is because, in the wrapped V-belts of Examples 1 to 3 a ratio of the total thickness of the first compression rubber layer 111 and the fabric-laminated body layer 120 (thickness from the belt inner surface to the fabric-laminated body layer 120) h1 with respect to the entire thickness H of the wrapped V-belt 100 in the belt thickness direction of the wrapped V-belt 100, and a ratio of the thickness h2 of the first compression rubber layer 111 with respect to the entire thickness H of the wrapped V-belt 100 are more appropriate from the viewpoint of crack resistance as compared to the wrapped V-belt of Example 4. In addition, it is ascertained that the time period until cracks are generated in the wrapped V-belts of Examples 6 to 8 was longer than that of the wrapped V-belt of Example 9. It is considered that this is because, in the wrapped V-belts of Examples 6 to 8, a ratio of the thickness of the fabric-laminated body layer 220 (thickness from the belt inner surface to the fabric-laminated body layer 220) h3 with respect to the entire thickness H of the wrapped V-belt 100 in the belt thickness direction of the wrapped V-belt 100 is more appropriate from the viewpoint of crack resistance as compared to the wrapped V-belt of Example 9.

[Consideration]

From the above, according to the wrapped V-belts of Examples 1 to 5 manufactured by the method for manufacturing a wrapped V-belt of the first embodiment and the wrapped V-belts of Examples 6 to 10 manufactured by the method for manufacturing a wrapped V-belt of the second embodiment, it is ascertained that it is possible to suppress generation of cracks in the notch portions to improve crack resistance. In other words, it is apparent that in order to improve the crack resistance, as in Examples 1 to 10, a wrapped V-belt may be formed such that the compression layer includes the compression rubber layer and the fabric-laminated body layer, and the top of the notch portion is disposed in the fabric-laminated body layer.

In addition, it is ascertained that in order to improve the crack resistance, as in Examples 1 to 5 manufactured by the method for manufacturing a wrapped V-belt according to the first embodiment, in the wrapped V-belt 100 according to the first embodiment, the compression layer 110 may be formed such that the ratio of the total thickness h1 of the first compression rubber layer 111 and the fabric-laminated body layer 120 with respect to the entire thickness H of the wrapped V-belt 100 is from 45 to 65% (preferably, from 45 to 55%) in the belt thickness direction of the wrapped V-belt 100. In addition, it is ascertained that it may be formed such that the ratio of the thickness h2 of the first compression rubber layer 111 with respect to the entire thickness H of the wrapped V-belt 100 is from 15 to 25% (preferably, from 20 to 25%) in the belt thickness direction of the wrapped V-belt 100.

In addition, it is ascertained that in order to improve crack resistance, as in Examples 6 to 10 manufactured by the method for manufacturing a wrapped V-belt according to the second embodiment, in the wrapped V-belt 200 according to the second embodiment, the compression layer 210 may be formed such that the ratio of the thickness h3 of the fabric-laminated body layer 220 with respect to the entire thickness H of the wrapped V-belt 200 is from 45 to 65% (preferably, from 45 to 55%) in the belt thickness direction of the wrapped V-belt 200.

Furthermore, it is ascertained that in order to further improve crack resistance, as in Examples 6 to 10 manufactured by the method for manufacturing a wrapped V-belt according to the second embodiment, the belt inner surface side may be configured of the fabric-laminated body layer.

The present invention is described in detail with reference to specific embodiments, but it is apparent for those skilled in the art that various changes or modifications can be added without departing from the spirit and the scope of the present invention.

This application is based upon Japanese Patent Application No. 2015-090863, filed on Apr. 27, 2015 and Japanese Patent Application No. 2016-082404, filed on Apr. 15, 2016, the contents of which are incorporated herein by reference.

INDUSTRIAL APPLICABILITY

When using the present invention, regarding a wrapped V-belt having notch portions, it is possible to provide a wrapped V-belt and a method for manufacturing a wrapped V-belt which can improve crack resistance.

DESCRIPTION OF REFERENCE NUMERALS AND SIGNS

100 WRAPPED V-BELT
110 COMPRESSION LAYER
111 FIRST COMPRESSION RUBBER LAYER
112 SECOND COMPRESSION RUBBER LAYER
113 COMPRESSION RUBBER LAYER
120 FABRIC-LAMINATED BODY LAYER
121 FABRIC
122 RUBBER COMPOSITION
130 TENSION RUBBER LAYER
140 TENSION MEMBER
141 CORE WIRE
150 BELT MAIN BODY
160 OUTSIDE CLOTH
170 NOTCH PORTION
200 WRAPPED V-BELT
210 COMPRESSION LAYER
211 COMPRESSION RUBBER LAYER
220 FABRIC-LAMINATED BODY LAYER
221 FABRIC
222 RUBBER COMPOSITION
270 NOTCH PORTION

The invention claimed is:

1. A wrapped V-belt that is made to travel while a belt inner surface side thereof is wound around a pulley, comprising:
a belt main body comprising
a compression layer disposed on the belt inner surface side and comprising a compression rubber layer and a fabric-laminated body layer in which a plurality of pieces of a rubber composition-attached fabric are laminated and adhered to each other,
a tension rubber layer disposed on a belt outer surface side, and
a tension member buried between the compression layer and the tension rubber layer,
wherein the belt main body has a V shape with a width on the belt inner surface side being smaller than a width on the belt outer surface side on a section in a belt width direction,
wherein the compression layer has a plurality of notch portions formed to extend in the belt width direction to be open on the belt inner surface side, and disposed to be aligned in a belt circumferential direction, and
wherein a notch portion among the plurality of notch portions has a top positioned on the most belt outer surface side in a belt thickness direction and disposed in the fabric-laminated body layer, a part of the fabric-laminated body layer is cut by the notch portion, and the fabric-laminated body layer is exposed in the notch portion; and
an outside cloth that covers a periphery of the belt main body over an entire length in the belt circumferential direction, but does not cover the belt inner surface side of the notch portions.

2. The wrapped V-belt according to claim 1, wherein the compression rubber layer comprises a first compression rubber layer and a second compression rubber layer, and
the compression layer is disposed in order of the first compression rubber layer, the fabric-laminated body layer and the second compression rubber layer from the belt inner surface side to the belt outer surface side.

3. The wrapped V-belt according to claim 2, wherein in the belt thickness direction of the wrapped V-belt, a ratio of a total thickness of the first compression rubber layer and the fabric-laminated body layer with respect to an entire thickness of the wrapped V-belt is from 45 to 65%, and a ratio of a thickness of the first compression rubber layer with respect to the entire thickness of the wrapped V-belt is from 15 to 25%.

4. The wrapped V-belt according to claim 2, wherein in the belt thickness direction of the wrapped V-belt, a ratio of a total thickness of the first compression rubber layer and the fabric-laminated body layer with respect to an entire thickness of the wrapped V-belt is from 45 to 55%, and a ratio of a thickness of the first compression rubber layer with respect to the entire thickness of the wrapped V-belt is from 20 to 25%.

5. The wrapped V-belt according to claim 1, wherein the compression layer is disposed in order of the fabric-laminated body layer and the compression rubber layer from the belt inner surface side to the belt outer surface side.

6. The wrapped V-belt according to claim 5, wherein in the belt thickness direction of the wrapped V-belt, a ratio of a thickness of the fabric-laminated body layer with respect to an entire thickness of the wrapped V-belt is from 45 to 65%.

7. The wrapped V-belt according to claim 5, wherein in the belt thickness direction of the wrapped V-belt, a ratio of a thickness of the fabric-laminated body layer with respect to an entire thickness of the wrapped V-belt is from 45 to 55%.

8. The wrapped V-belt according to claim 1, wherein the notch portions formed in a plurality of rubber composition-attached fabrics, but are not formed in at least one rubber composition-attached fabric among the plurality of rubber composition-attached fabrics, and the at least one rubber composition-attached fabric is positioned on the most belt outer surface side among the plurality of rubber composition-attached fabrics.

9. The wrapped V-belt according to claim 1, wherein the notch portion is punched in the fabric-laminated body layer.

10. A method for manufacturing a wrapped V-belt comprises:
preparing a wrapped V-belt, the wrapped V-belt comprising:
a belt main body comprising
a compression layer disposed on a belt inner surface side and comprising a compression rubber layer and a fabric-laminated body layer in which a plurality of pieces of a rubber composition-attached fabric are laminated and adhered to each other,
a tension rubber layer disposed on a belt outer surface side, and
a tension member buried between the compression layer and the tension rubber layer; and
forming notch portions to extend in a belt width direction to be open on the belt inner surface side of the compression layer and disposed to be aligned in a belt circumferential direction such that a notch portion, among the notch portions, has a top positioned on the most belt outer surface side in a belt thickness direction in the fabric-laminated body layer, and is formed so as to cut a part of the fabric-laminated body layer, and the fabric-laminated body layer is exposed in the notch portion,
wherein the wrapped V-belt further comprises an outside cloth that covers a periphery of the belt main body over an entire length in the belt circumferential direction, but does not cover the belt inner surface side of the notch portions.

11. The method for manufacturing a wrapped V-belt according to claim 10, wherein
the compression rubber layer comprises a first compression rubber layer and a second compression rubber layer, and
the preparing a wrapped V-belt comprises:
forming a formed body by winding an unvulcanized rubber composition sheet to be the first compression rubber layer, a fabric-laminated body to be the fabric-laminated body layer in which a plurality of pieces of the rubber composition-attached fabric are laminated, an unvulcanized rubber composition sheet to be the second compression rubber layer, a core wire to form the tension member, and an unvulcanized rubber sheet to be the tension rubber layer in this order from the belt inner surface side to the belt outer surface side, in a forming drum;
processing the formed body into the belt main body by cutting to have a predetermined width and by cutting to have a V shape with a width on the belt inner surface side being smaller than a width on the belt outer surface side on a section in the belt width direction; and
winding the outside cloth on the belt main body and conducting vulcanization.

12. The method for manufacturing a wrapped V-belt according to claim 10, wherein the preparing a wrapped V-belt comprises:
forming a formed body by winding a fabric-laminated body to be the fabric-laminated body layer in which a plurality of pieces of the rubber composition-attached fabric are laminated, an unvulcanized rubber composition sheet to be the compression rubber layer, a core wire to form the tension member, and an unvulcanized rubber sheet to be the tension rubber layer in this order from the belt inner surface side to the belt outer surface side, in a forming drum;
processing the formed body into the belt main body by cutting to have a predetermined width and by cutting to have a V shape with a width on the belt inner surface side being smaller than a width on the belt outer surface side on a section in the belt width direction; and
winding the outside cloth on the belt main body and conducting vulcanization.

13. The method for manufacturing a wrapped V-belt according to claim 10, wherein the notch portion is punched in the fabric-laminated body layer.

\* \* \* \* \*